(12) United States Patent
Chen et al.

(10) Patent No.: US 11,947,726 B2
(45) Date of Patent: Apr. 2, 2024

(54) MULTI-ORIENTATION FINGERTIP PLANAR TACTILE FEEDBACK DEVICE

(71) Applicant: SOOCHOW UNIVERSITY, Suzhou (CN)

(72) Inventors: Tao Chen, Suzhou (CN); Zhiwei Dai, Suzhou (CN); Minglu Zhu, Suzhou (CN); Huibin Jia, Suzhou (CN); Lining Sun, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 8 days.

(21) Appl. No.: 18/032,699

(22) PCT Filed: Oct. 24, 2022

(86) PCT No.: PCT/CN2022/126997
§ 371 (c)(1),
(2) Date: Apr. 19, 2023

(65) Prior Publication Data
US 2024/0028122 A1    Jan. 25, 2024

(30) Foreign Application Priority Data

Jun. 8, 2022 (CN) .......................... 202210644470.6

(51) Int. Cl.
*G06F 3/01* (2006.01)
(52) U.S. Cl.
CPC .............. *G06F 3/016* (2013.01); *G06F 3/014* (2013.01)
(58) Field of Classification Search
None
See application file for complete search history.

(56) References Cited

U.S. PATENT DOCUMENTS

| | | | | |
|---|---|---|---|---|
| 2018/0335841 | A1* | 11/2018 | Rubin | G06F 3/0233 |
| 2020/0026352 | A1* | 1/2020 | Wang | G06F 3/044 |
| 2020/0326780 | A1* | 10/2020 | Kearney | G06F 3/04815 |
| 2022/0083140 | A1* | 3/2022 | Ogita | G06F 3/011 |
| 2022/0113797 | A1 | 4/2022 | Buchanan, IV et al. | |
| 2023/0263687 | A1* | 8/2023 | Zhakypov | A61H 1/0288 |
| | | | | 601/40 |

FOREIGN PATENT DOCUMENTS

| | | |
|---|---|---|
| CN | 109343711 A | 2/2019 |
| CN | 111813259 A | 10/2020 |
| CN | 115033100 A | 9/2022 |

\* cited by examiner

*Primary Examiner* — Krishna P Neupane
(74) *Attorney, Agent, or Firm* — SZDC Law PC

(57) ABSTRACT

A multi-orientation fingertip planar tactile feedback device includes a planar tactile feedback actuator. The planar tactile feedback actuator includes a holder and a feedback mechanism, a holding hole and an accommodating cavity are provided in the holder, one end of the holding hole penetrates through the holder, the other end is communicated with the accommodating cavity, the feedback mechanism includes a plurality of feedback parts that are arranged on cavity walls of the accommodating cavity respectively, and each feedback part includes a base, an air bag block and a baffle which are sequentially connected. A structure is simple; a finger touch force can be adjusted; five pairs of electrified coils are arranged, and force feedback vector synthesis can be performed therebetween; a direction of the force feedback generated by the electrified coil can be consistent with a direction of tactile feedback of the distal finger segment by the baffle.

6 Claims, 18 Drawing Sheets

(b1)

(b2)

MULTI-ORIENTATION FINGERTIP PLANAR TACTILE FEEDBACK DEVICE

This application is the National Stage Application of PCT/CN2022/126997, filed on Oct. 24, 2022, which claims priority to Chinese Patent Application No. 202210644470.6, filed on Jun. 8, 2022, which is incorporated by reference for all purposes as if fully set forth herein.

FIELD OF THE DISCLOSURE

The present invention relates to the field of human-computer interaction technologies, and particularly to a multi-orientation fingertip planar tactile feedback device.

BACKGROUND OF THE DISCLOSURE

During contact of a human with a natural objective world, the tactile perception feedback system of the human provides bidirectional information and energy interaction that other perception systems (visual, auditory, or the like) do not have.

A force and tactile feedback device is a system which can bring tactile and force information to an experiencer and can carry out bidirectional information feedback transmission, and can greatly increase a sense of reality and immersion brought to the experiencer by a virtual world. Currently, an immersive virtual development focuses on feedback, an initial development starts from a wearable apparatus (gloves, or the like), and the feedback gloves are formed by adding tactile feedback units at fingertips, palms, or the like, based on data gesture gloves. When a virtual object is grabbed by wearing the data glove with force feedback, the data glove can generate a force for moving the hand outwards, and the force has to have a same magnitude and direction as a force generated for the hand when a real object exists, thereby realizing an immersive experience.

For the existing feedback device, finger grabbing, touching, or the like, are researched, and when a finger touches a surface of an object, and a distal finger segment touches the object in different orientations and gestures, parts of the distal finger segment in contact with the surface of the object are distributed at different positions of a surface of the distal finger segment. In the traditional fingertip feedback device, information is only limited to force and tactile feedback information at a bottom of the distal finger segment, and importance of tactile feedback of different parts of the distal finger segment, such as a front part, a side part, a front lower part, or the like, is usually ignored, such that the feedback is inaccurate and unreal.

SUMMARY OF THE DISCLOSURE

In order to overcome defects in a prior art, an object of the present invention is to provide a multi-orientation fingertip planar tactile feedback device.

The present invention has the beneficial effects as follows. (1) The structure is simple, tactile feedback of the baffle and force feedback of mutual repulsion of the electrified coils are combined, and meanwhile, accuracy of a touch part fed back to a distal finger segment of an executor by touch of a surface of an object by the distal finger segment is guaranteed. (2) The tactile feedback of corresponding contact information parts may be realized in reality for touch of the object by different parts of the distal finger segment, thus improving accuracy of tactile information feedback transmission. (3) A finger touch force can be adjusted by inflating the air bag block. (4) Finger tactile force feedback information is transmitted using a principle that the electrified coils generate magnetic fields repelling each other. (5) Five pairs of electrified coils are arranged, and vector synthesis can be performed on the force feedback generated by the magnetic fields generated by each pair of electrified coils for the distal finger segment, thus realizing the force feedback of the distal finger segment in all orientations and directions. (6) A direction of the force feedback generated by the electrified coil can be consistent with a direction of the tactile feedback of the distal finger segment by the baffle, thus transmitting force and tactile feedback information of finger touch, and transmitting a real touch sense to a finger of an executor.

DETAILED DESCRIPTION OF PREFERRED EMBODIMENTS

In order to make those skilled in the art better understand the technical solutions in the present invention, the following clearly and completely describes the technical solutions of the embodiments of the present invention with reference to the accompanying drawings in the embodiments of the present invention.

When a virtual scenario and an object in the scenario are made, Unity3D software is adopted, a virtual model is made using inertial sensors, the inertial sensors include an accelerometer, a gyroscope and a magnetometer, gesture data of a hand and a finger is obtained by the sensors, the hand data is then processed and introduced into the Unity scenario to obtain a hand model, a USB wireless signal receiver is then connected with a data interface of a specific hand model, the hand data and a real-time change of gestures are obtained, the data is sent out by broadcasting, and corresponding broadcast data is connected on a UI operated by a hand of Unity, so as to acquire a hand gesture in Unity in real time.

Figure 21:
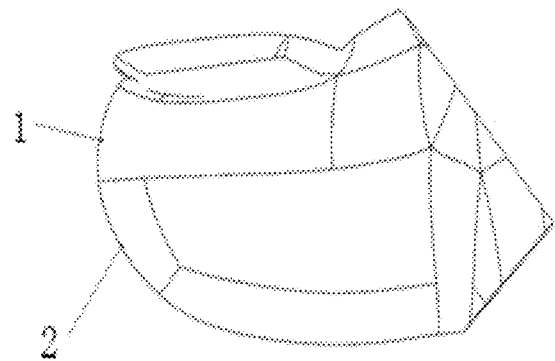
FIG. 21 is a side view of divided modules of a virtual finger.
Figure 22:
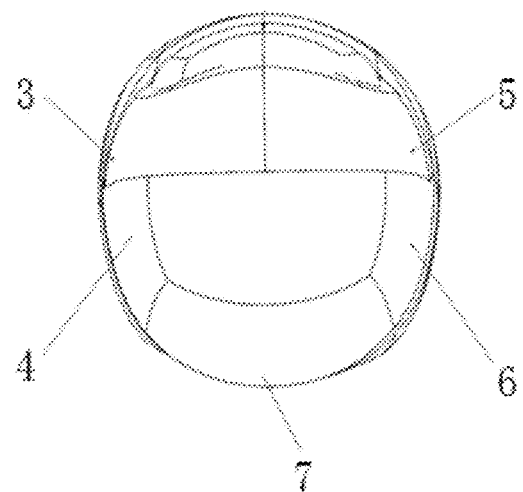
FIG. 22 is a front view of the divided modules of the virtual finger.

A steamVR software development kit is introduced, the two software development kits are combined, a tracker Tracker of HTC VIVE is mounted at a wrist, a locator steamVR2.0 is mounted in a real scenario, and a position of the tracker in a range of the locator is matched with a position of a virtual hand in a Main Camera view field in the Unity scenario through the combination of the software development kits, thereby realizing real-time consistency of the movement and gesture of the human hand in the real scenario with the position and gesture of the virtual model hand in Unity. A virtual distal finger segment in Unity3D is divided into seven modules including a front side module 1, a front lower side module 2, an upper left side module 3, a lower left side module 4, an upper right side module 5, a lower right side module 6 and a lower side module 7, as shown in FIGS. 21 and 22; a touch detection algorithm is added to each module to achieve a purpose that when the virtual model touches the object, the touch detection algorithm of the corresponding module touching the object can be accurately triggered, an accurate touch signal is transmitted by a PC, and data conversion and next operation are performed on the signal.

Figure 1:
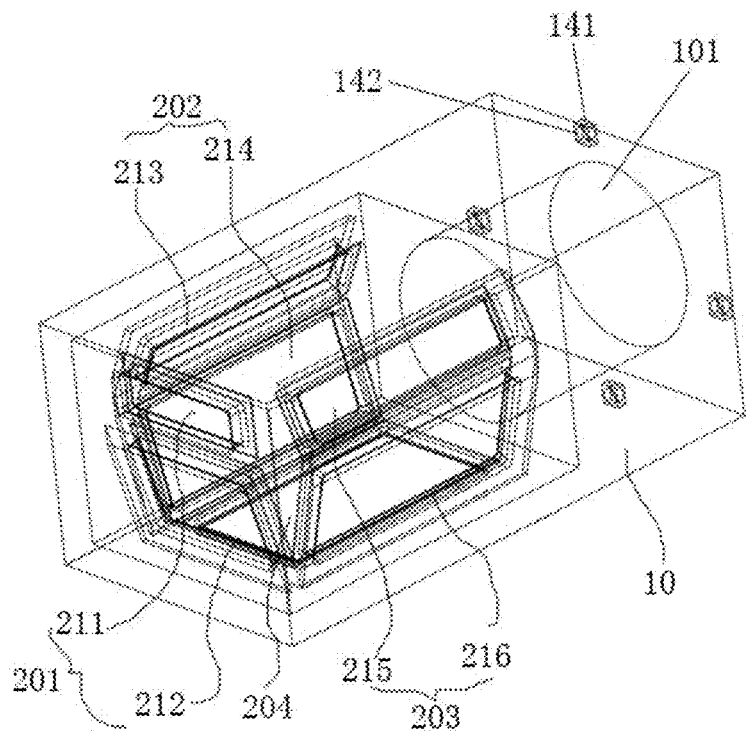
FIG. 1 is a schematic structural diagram in which a plurality of feedback parts are provided in a holder according to a preferred embodiment of the present invention.
Figure 2:
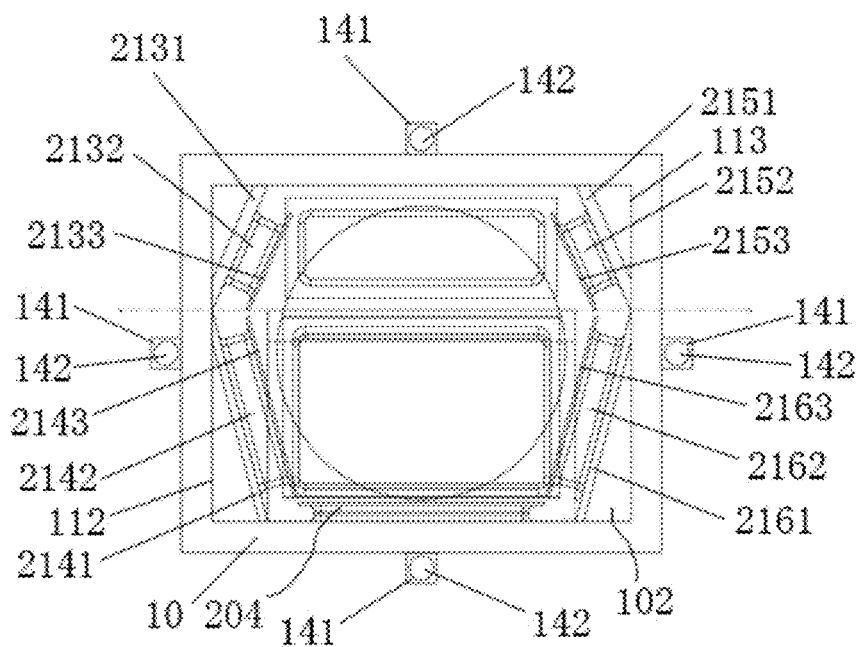
FIG. 2 is a front view of FIG. 1.
Figure 3:
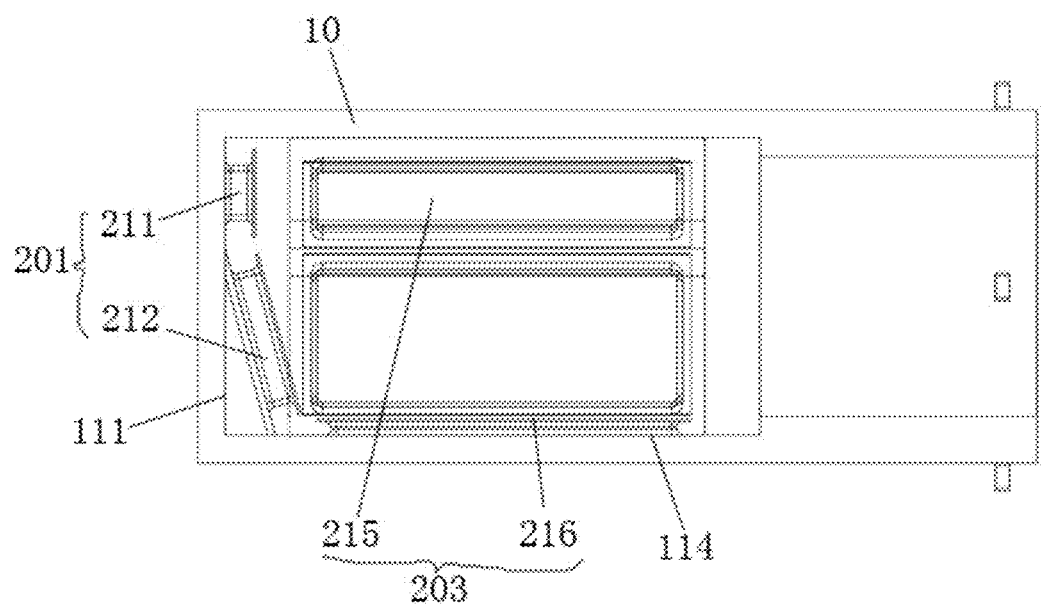
FIG. 3 is a side view of FIG. 1.
Figure 4:
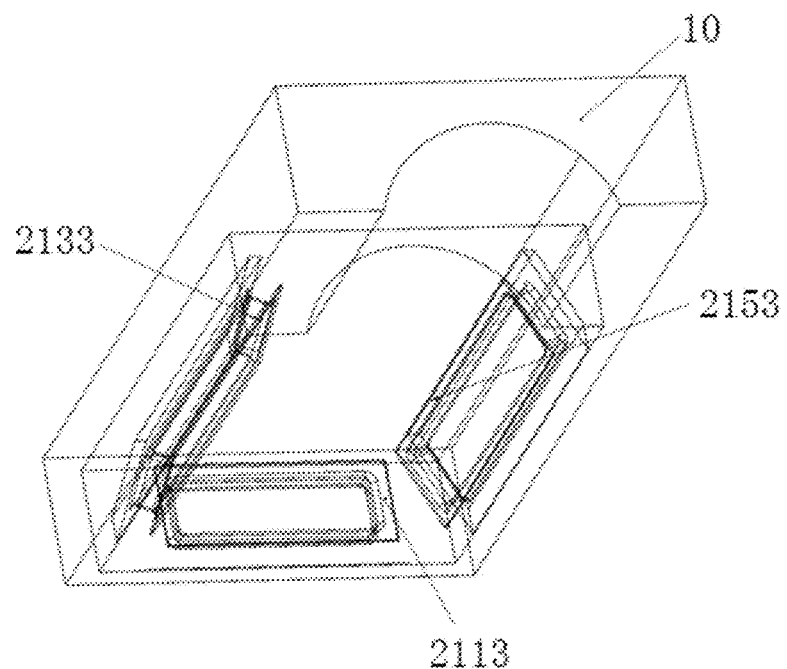
FIG. 4 is a schematic diagram of an upper structure taken along the dotted line shown in FIG. 2.
Figure 5:
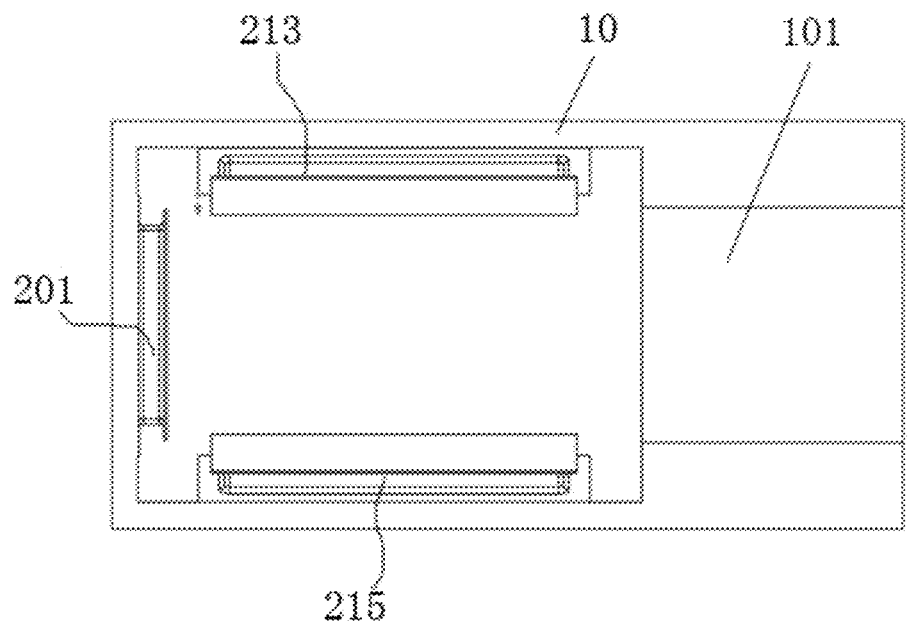
FIG. 5 is an internal top view of FIG. 4.
Figure 6:
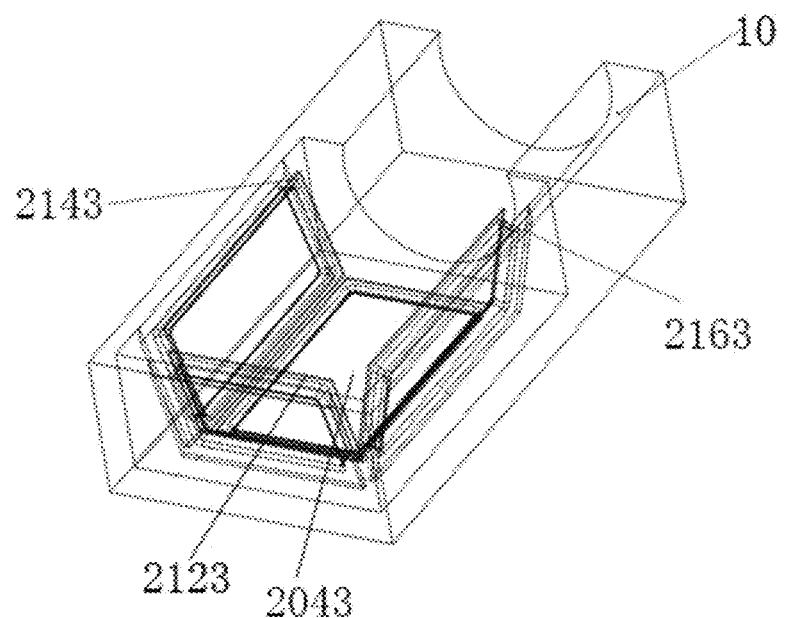
FIG. 6 is a schematic diagram of a lower structure taken along the dotted line shown in FIG. 2.
Figure 7:
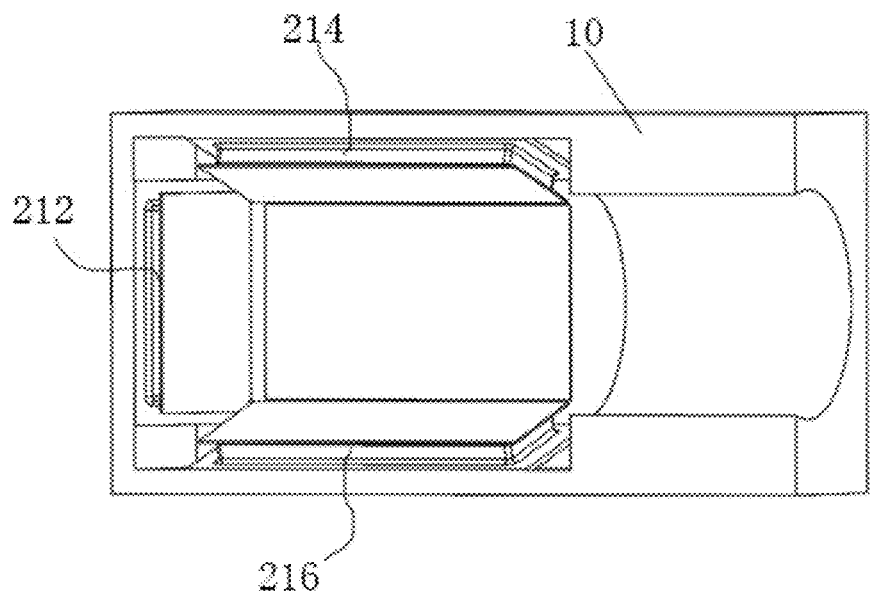
FIG. 7 is a top view of FIG. 6.
Figure 8:
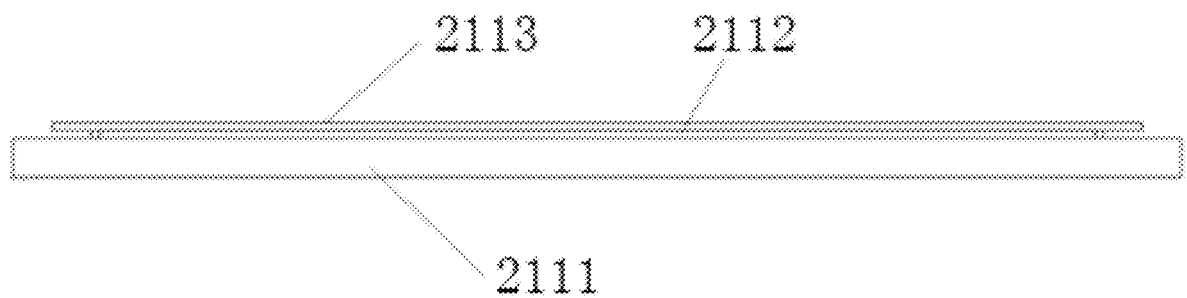
FIG. 8 is a schematic structural diagram in which a front side air bag block of a front side feedback part is not inflated in the preferred embodiment of the present invention.
Figure 9:
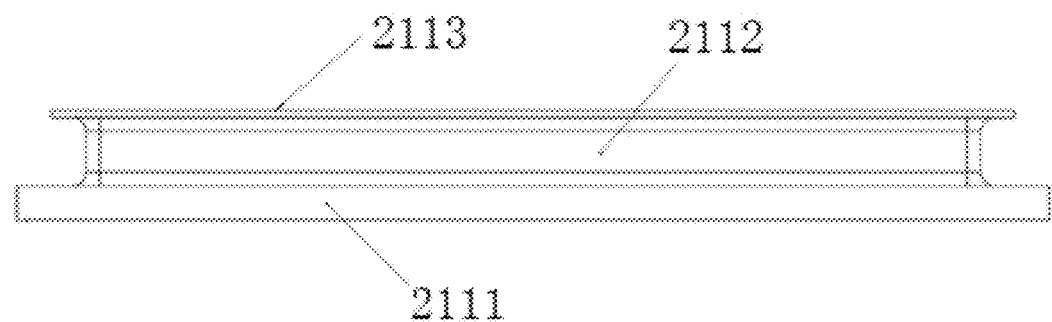
FIG. 9 is a schematic structural diagram in which the front side air bag block of the front side feedback part is inflated in the preferred embodiment of the present invention.
Figure 10:
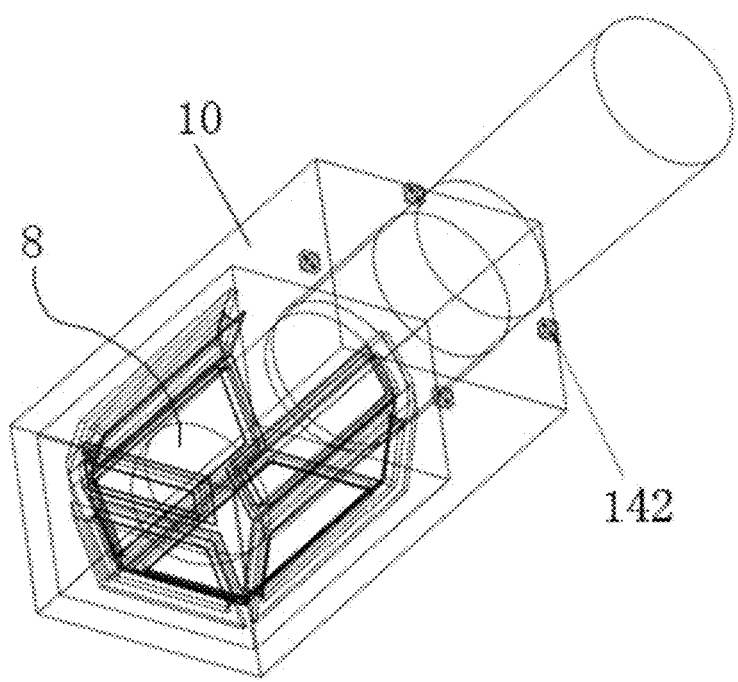
FIG. 10 is a schematic structural diagram of a finger-worn planar tactile feedback actuator in the preferred embodiment of the present invention.
Figure 11:
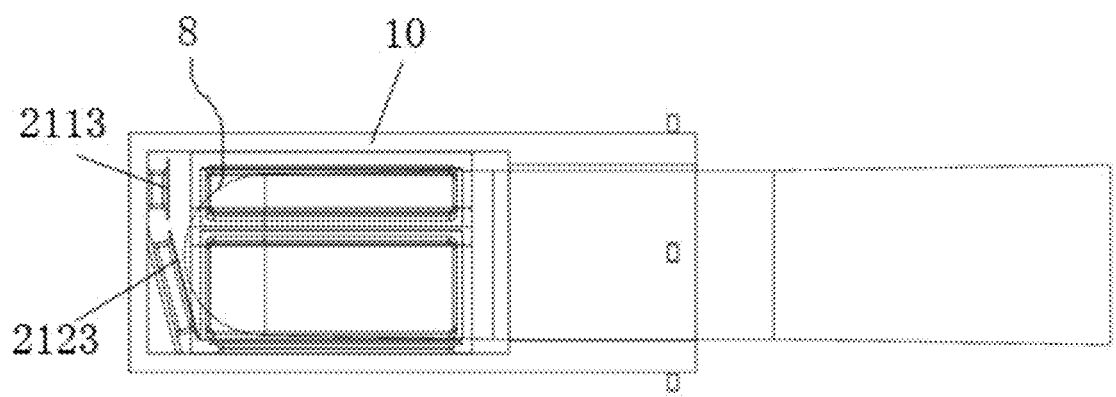
FIG. 11 is a side view of the finger-worn planar tactile feedback actuator in the preferred embodiment of the present invention.
Figure 12:
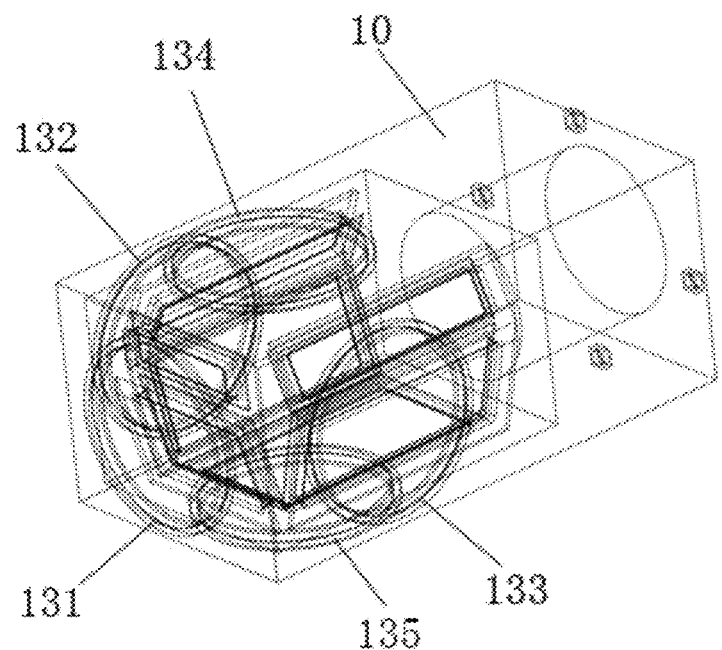
FIG. 12 is a schematic structural diagram in which a first electrified coil set is provided on an outer wall of the holder in the preferred embodiment of the present invention.
Figure 13:
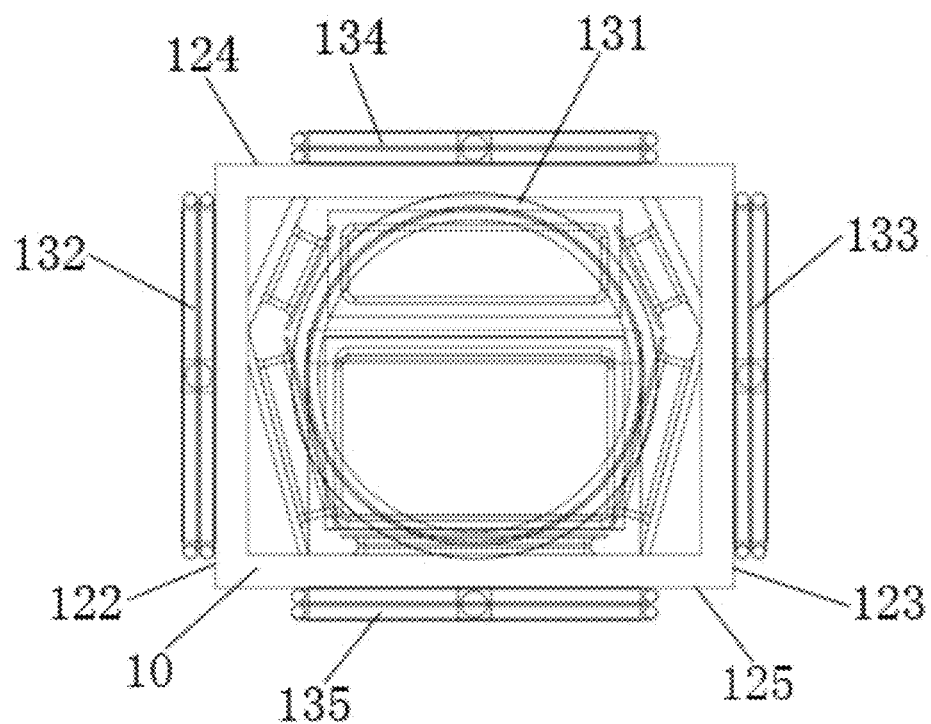
FIG. 13 is a front view of FIG. 12.
Figure 14:
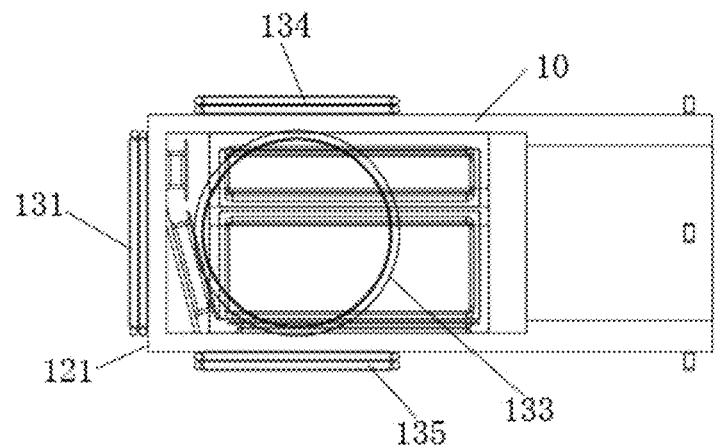
FIG. 14 is a side view of FIG. 12.
Figure 15:
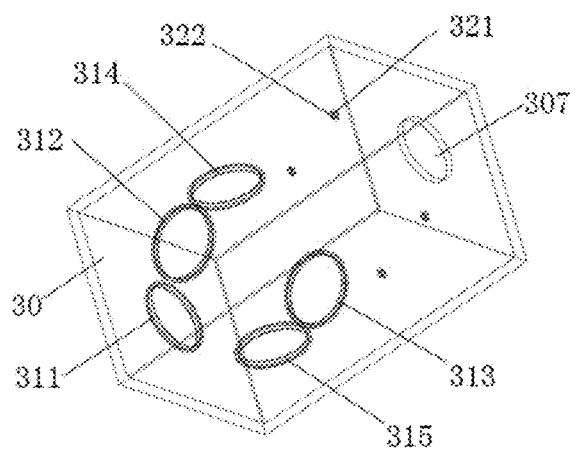
FIG. 15 is a schematic structural diagram in which a second energized coil set is provided on an inner wall of a shell.
Figure 16:
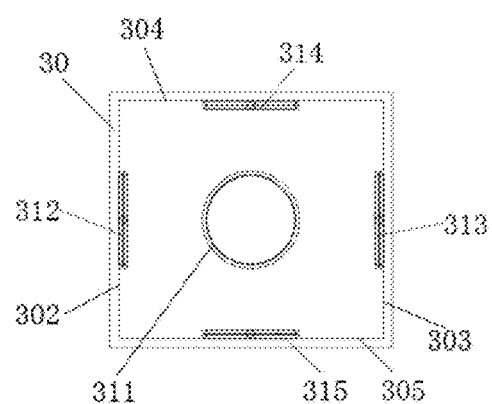
FIG. 16 is a front view of FIG. 15.
Figure 17:
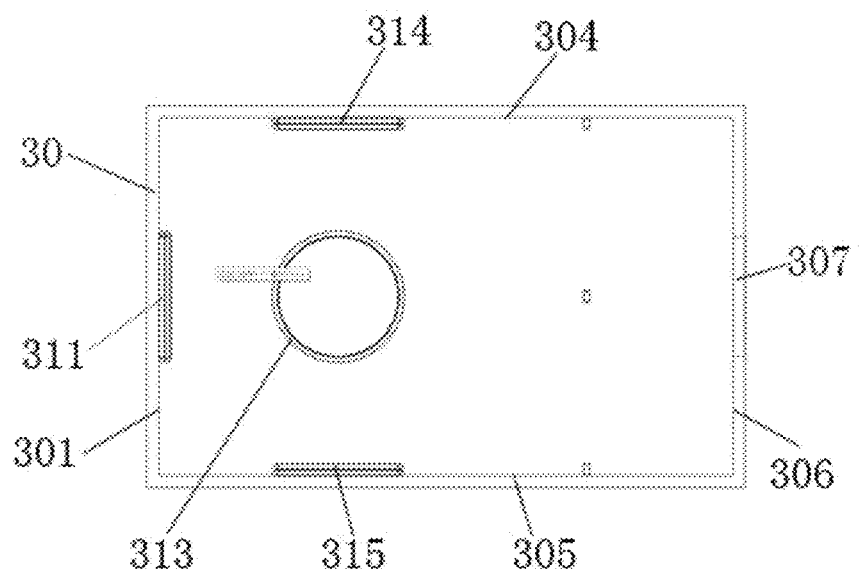
FIG. 17 is a side view of FIG. 15.
Figure 18:
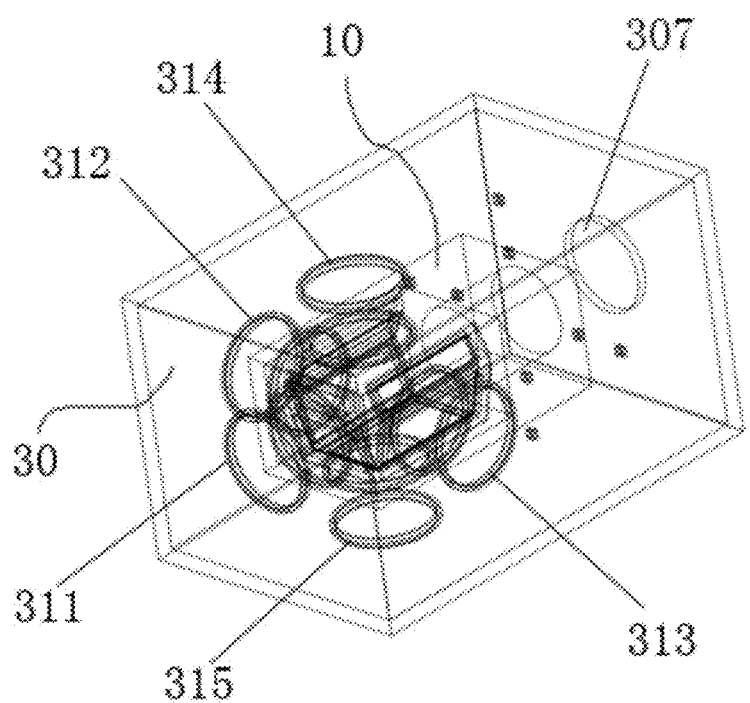
FIG. 18 is a schematic structural diagram in which the holder is provided in the shell.
Figure 19:
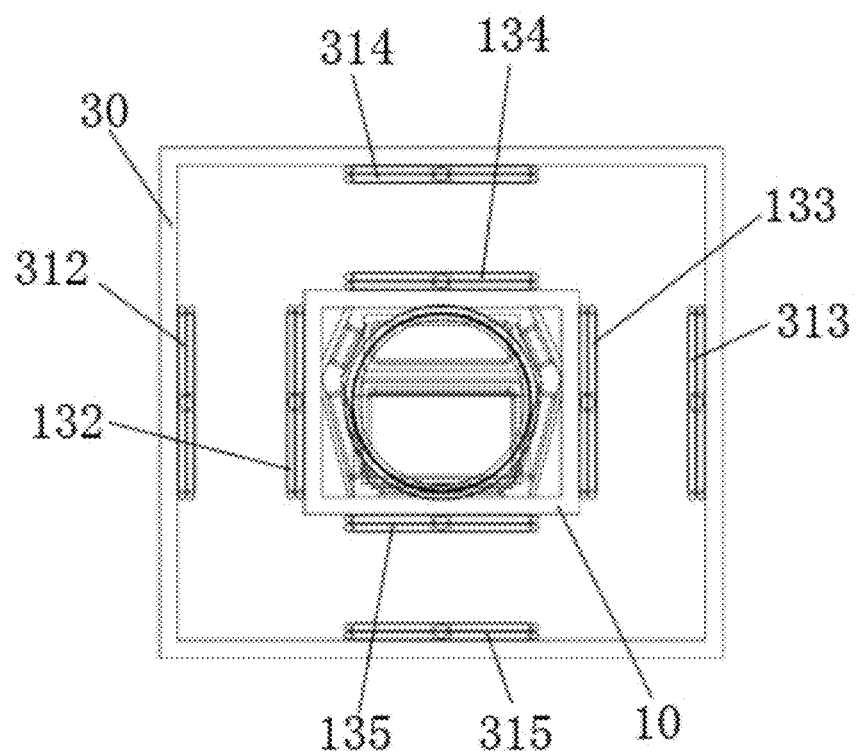
FIG. 19 is a front view of FIG. 18.
Figure 20:
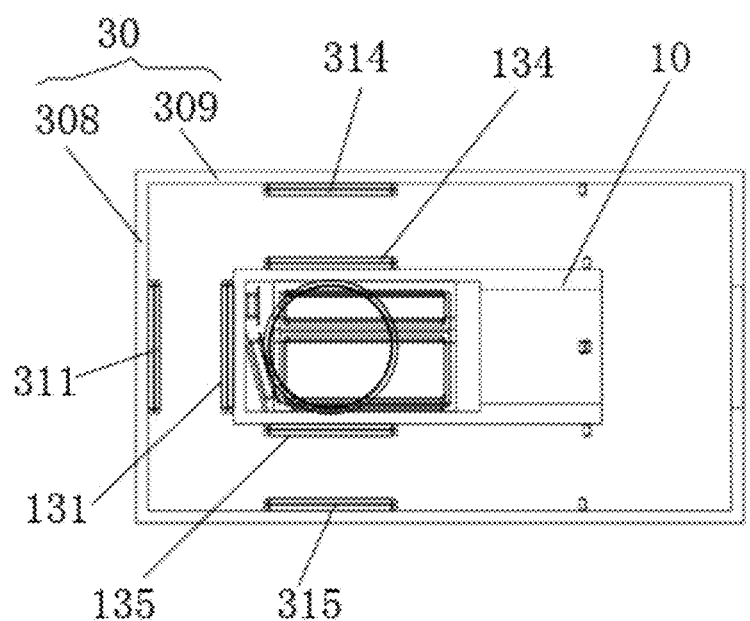
FIG. 20 is a side view of FIG. 18.

Referring to FIGS. 1 to 3, a multi-orientation fingertip planar tactile feedback device includes a planar tactile feedback actuator, wherein the planar tactile feedback actuator includes a holder 10 and a feedback mechanism, a holding hole 101 and an accommodating cavity 102 are provided in the holder 10, one end of the holding hole 101 penetrates through the holder the other end of the holding hole 101 is communicated with the accommodating cavity 102, the feedback mechanism includes a plurality of feedback parts, the feedback parts are arranged on cavity walls of the accommodating cavity 102 respectively, and each feedback part includes a base, an air bag block and a baffle which are sequentially connected.

In the present embodiment, the cavity walls of the accommodating cavity 102 include a front cavity wall 111, a left cavity wall 112, a right cavity wall 113, and a lower cavity wall 114, the plurality of feedback parts include a front feedback part 201, a left feedback part 202, a right feedback part 203, and a lower feedback part 204, and the front feedback part 201, the left feedback part 202, the right feedback part 203, and the lower feedback part 204 are arranged on the front cavity wall 111, the left cavity wall 112, the right cavity wall 113, and the lower cavity wall 114 respectively.

In order to correspond to each part of the fingertip conveniently, referring to FIGS. 1, 3, 10, and 11, preferably, the front feedback part 201 includes a front side feedback part 211 and a slant front lower feedback part 212, the front side feedback part 211 and the front lower feedback part 212 face a front side and a front lower side of the fingertip 8 respectively, the left feedback part 202 includes an upper left feedback part 213 and a lower left feedback part 214 which are obliquely arranged, the baffle of the upper left feedback part and the baffle of the lower left feedback part face an upper left side and a lower left side of the fingertip 8 respectively, the right feedback part 203 includes an upper right feedback part 215 and a lower right feedback part 216 which are obliquely arranged, the baffle of the upper right feedback part and the baffle of the lower right feedback part face an upper right side and a lower right side of the fingertip 8 respectively, and the lower feedback part 204 faces a lower side of the fingertip 8.

Referring to FIGS. 2 to 9, the front side feedback part 211 includes a front side base 2111, a front side air bag block 2112 and a front side baffle 2113 connected in sequence, the front lower feedback part 212 includes a front lower side base 2121, a front lower side air bag block 2122 and a front lower side baffle 2123 connected in sequence, the upper left feedback part 213 includes an upper left side base 2131, an upper left side air bag block 2132 and an upper left side baffle 2133 connected in sequence, the lower left feedback part 214 includes a lower left side base 2141, a lower left side air bag block 2142 and a lower left side baffle 2143 connected in sequence, the upper right feedback part 215 includes an upper right side base 2151, an upper right side air bag block 2152 and an upper right side baffle 2153 connected in sequence, the lower right feedback part 216 includes a lower right side base 2161, a lower right side air bag block 2162 and a lower right side baffle 2163 connected in sequence, and the lower feedback part 204 includes a lower side base 2041, a lower side air bag block 2042 and a lower side baffle 2043 connected in sequence. The baffle of the upper left feedback part is the upper left side baffle 2133, the baffle of the lower left feedback part is the lower left side baffle 2143, the baffle of the upper right feedback part is the upper right side baffle 2153, and the baffle of the lower right feedback part is the lower right side baffle 2163.

The feedback device further includes a hollow shell 30, the holder 10 is provided in the shell 30, a first electrified coil set is provided on an outer wall of the holder 10, and a second electrified coil set is provided on an inner wall of the shell 30.

Referring to FIGS. 12 to 20, the outer wall of the holder 10 includes an outer front wall 121, an outer left wall 122, an outer right wall 123, an outer upper wall 124, and an outer lower wall 125, the first electrified coil set includes a first front electrified coil 131, a first left electrified coil 132, a first right electrified coil 133, a first upper electrified coil 134, and a first lower electrified coil 135, the inner wall of the shell 30 includes an inner front wall 301, an inner left wall 302, an inner right wall 303, an inner upper wall 304, and an inner lower wall 305, the second electrified coil set includes a second front electrified coil 311, a second left electrified coil 312, a second right electrified coil 313, a second upper electrified coil 314, and a second lower electrified coil 315, and the first front electrified coil 131, the first left electrified coil 132, the first right electrified coil 133, the first upper electrified coil 134, and the first lower electrified coil 135 correspond to the second front electrified coil 311, the second left electrified coil 312, the second right electrified coil 313, the second upper electrified coil 314, and the second lower electrified coil 315 respectively.

Specifically, the first front electrified coil 131, the first left electrified coil 132, the first right electrified coil 133, the first upper electrified coil 134 and the first lower electrified coil 135 are arranged on the outer front wall 121, the outer left wall 122, the outer right wall 123, the outer upper wall 124 and the outer lower wall 125 respectively, and the second front electrified coil 311, the second left electrified coil 312, the second right electrified coil 313, the second upper electrified coil 314 and the second lower electrified coil 315 are arranged on the inner front wall 301, the inner left wall 302, the inner right wall 303, the inner upper wall 304 and the inner lower wall 305 respectively.

To facilitate insertion of the finger into the shell 30, an inner rear wall 306 of the shell 30 is preferably provided with a through hole 307 communicated with an interior of the shell 30.

In order to facilitate integration of the holder 10 in the shell 30, preferably, each of the outer left wall 122, the outer right wall 123, the outer upper wall 124, and the outer lower wall 125 of the holder 10 is provided with a first support block 141, the first support block 141 is provided with a first connection hole 142, each of the inner left wall 302, the inner right wall 303, the inner upper wall 304, and the inner lower wall 305 of the shell 30 is provided with a second support block 321, the second support block 321 is provided with a second connection hole 322, and the first support block 141 and the second support block 321 can be connected by passing a thin wire through the first connection hole 142 and the second connection hole 322.

In the present embodiment, the shell 30 includes a shell body 308, and a shell cover 309 provided on the shell body 308, and the shell cover 309 can be opened from the shell body 308 to facilitate placement of the holder 10 in the shell 30.

Figure 23:
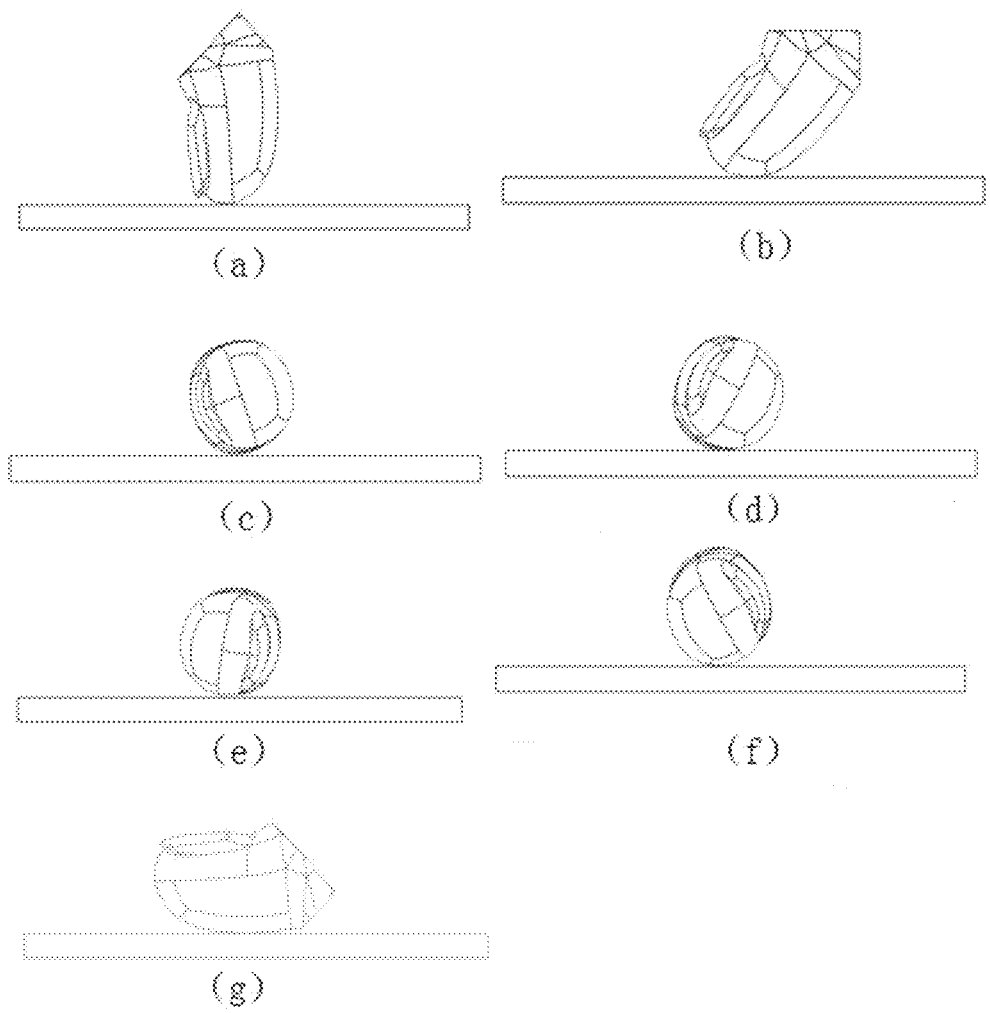
FIG. 23 is a schematic structural diagram in which the modules of the virtual finger touch an object.
Figure 24:
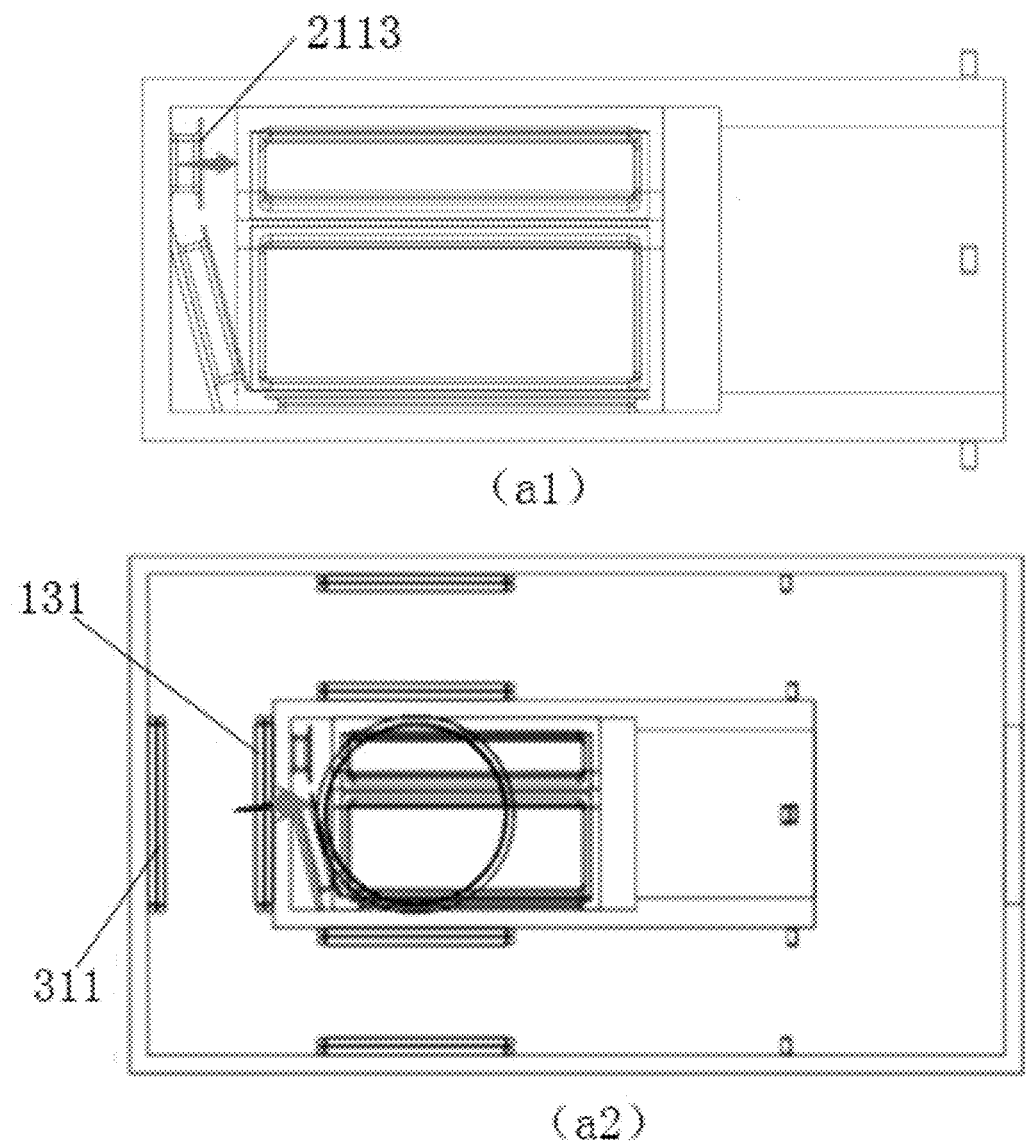
FIG. 24 is a schematic diagram of force feedback of a fingertip by a front side baffle, a first electrified coil set, and a second electrified coil set when a front side module of the virtual finger touches the object.
Figure 25:
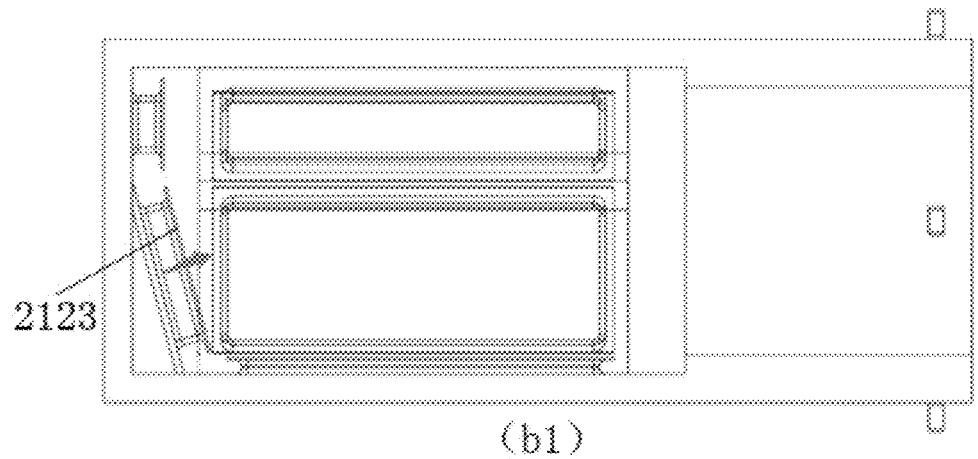
FIG. 25 is a schematic diagram of force feedback of the fingertip by a front lower side baffle, the first electrified coil set, and the second electrified coil set when a front lower side module of the virtual finger touches the object.
Figure 25:
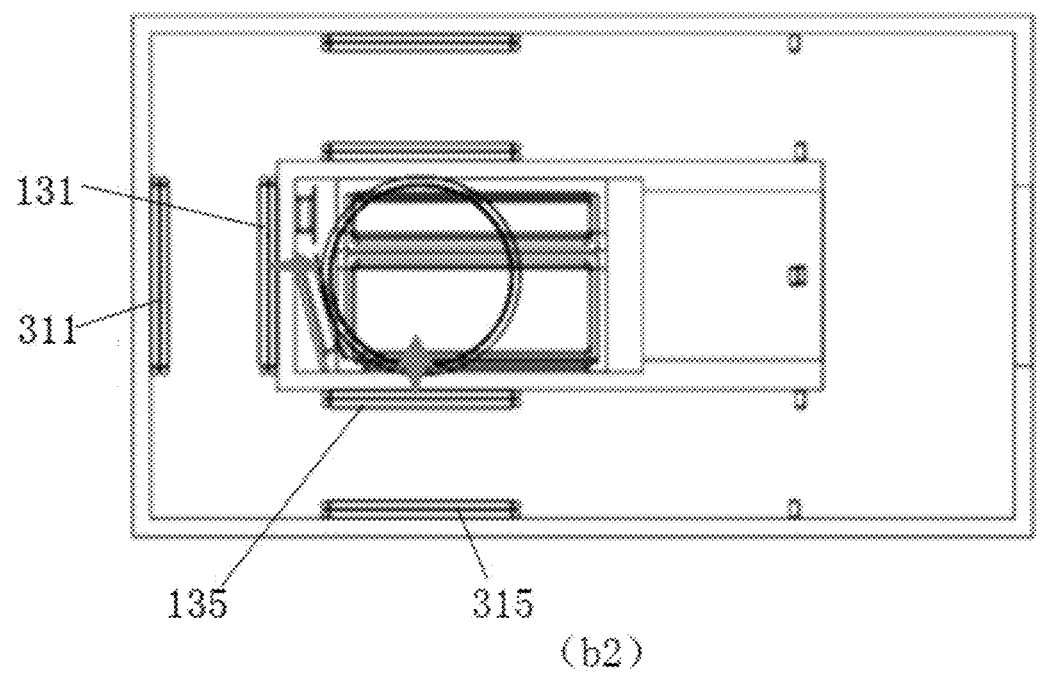
Figure 26:
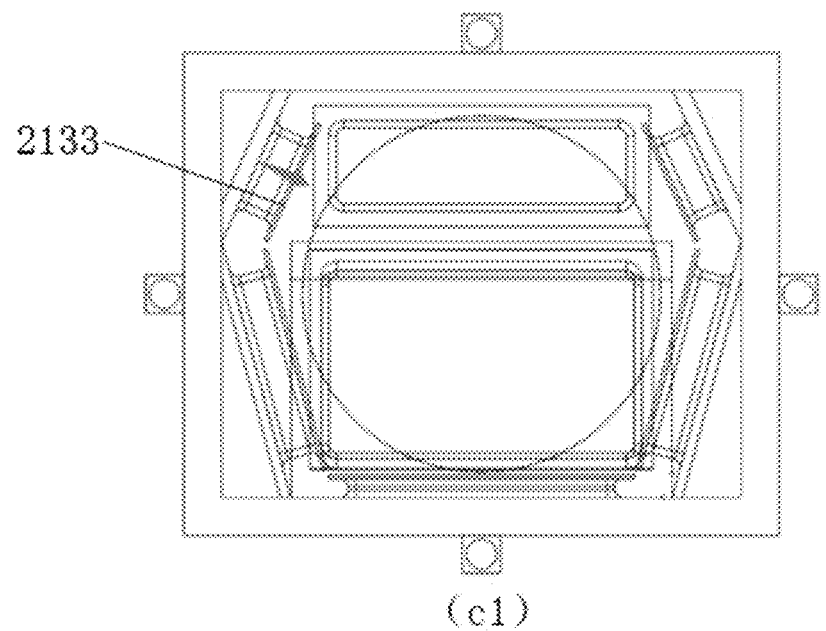
FIG. 26 is a schematic diagram of force feedback of the fingertip by an upper left side baffle, the first electrified coil set, and the second electrified coil set when an upper left side module of the virtual finger touches the object.
Figure 26:
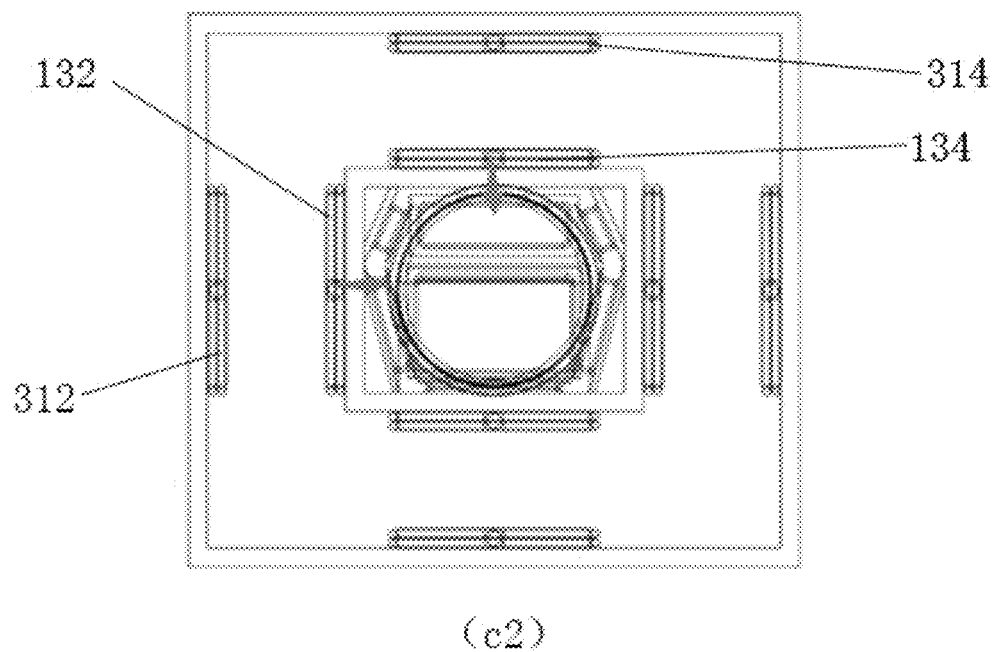
Figure 27:
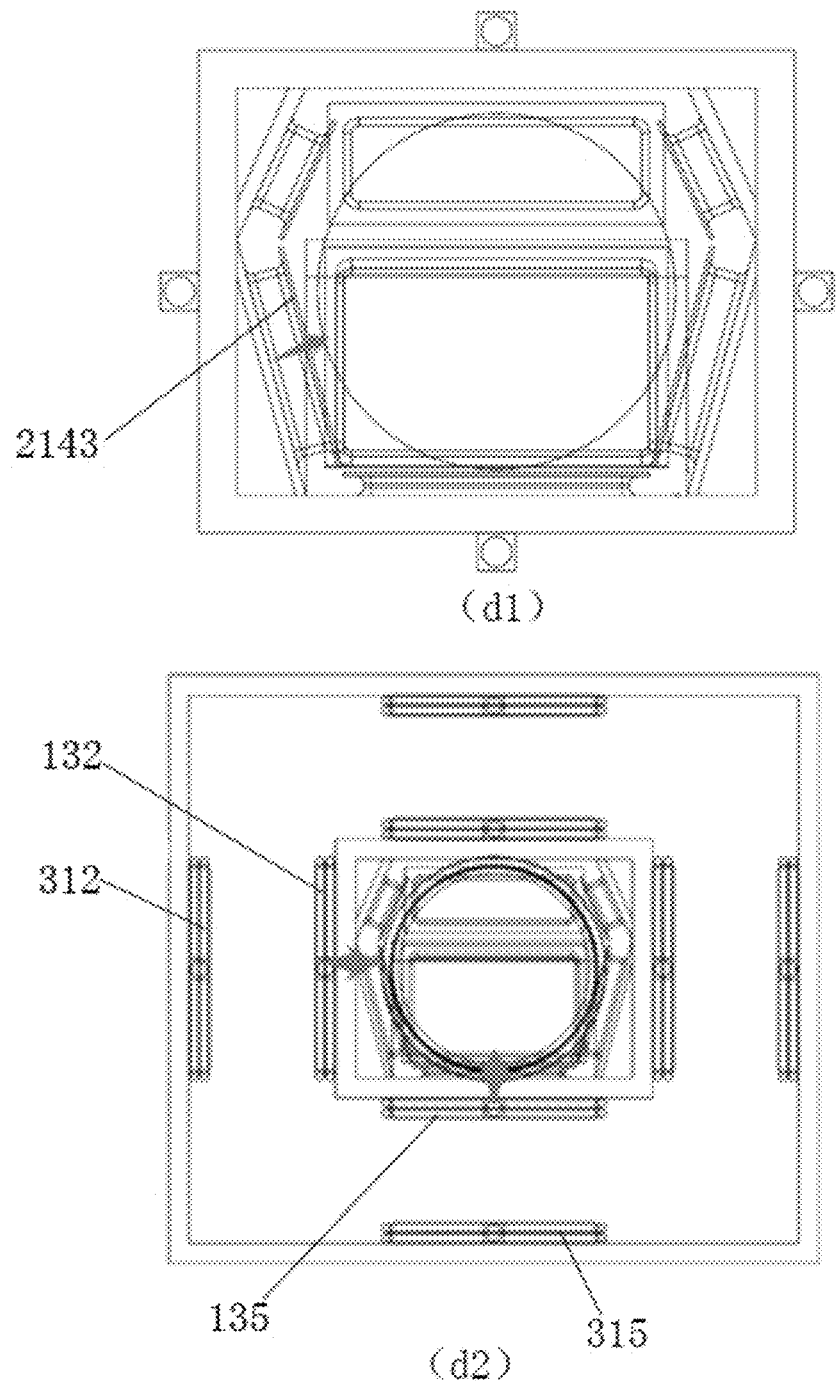
FIG. 27 is a schematic diagram of force feedback of the fingertip by a lower left side baffle, the first electrified coil set, and the second electrified coil set when a lower left side module of the virtual finger touches the object.
Figure 28:
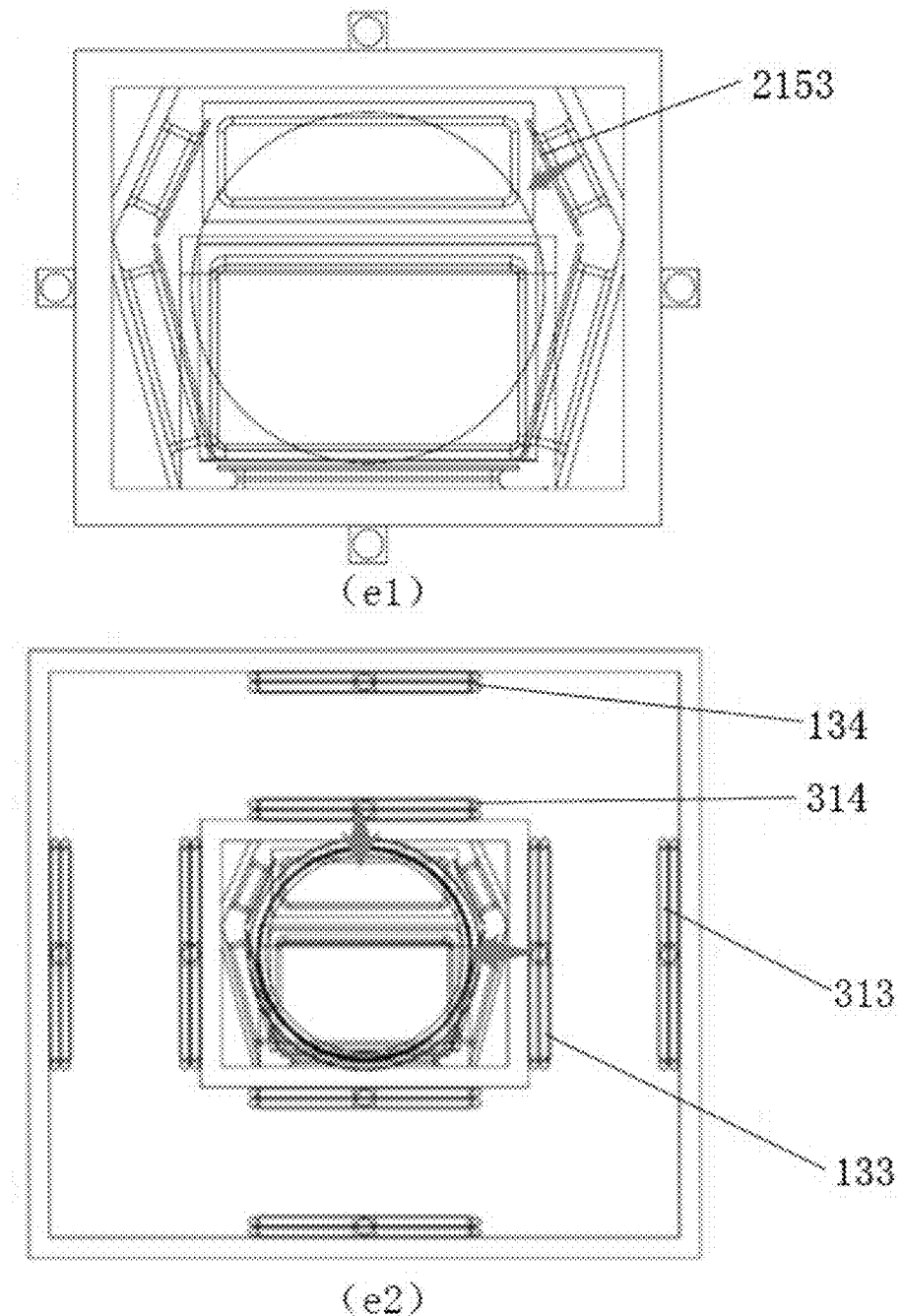
FIG. 28 is a schematic diagram of force feedback of the fingertip by an upper right side baffle, the first electrified coil set, and the second electrified coil set when an upper right side module of the virtual finger touches the object.
Figure 29:
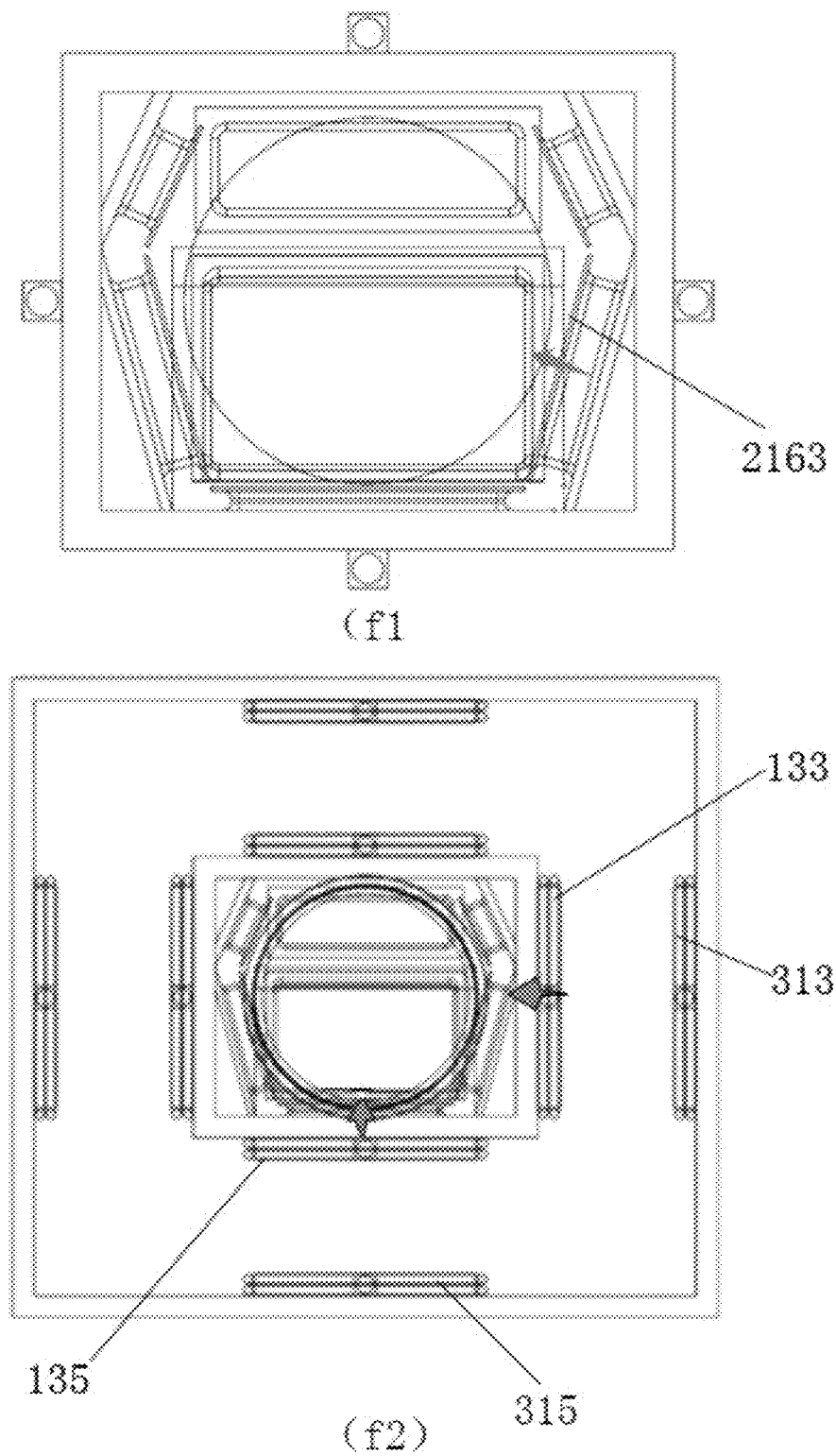
FIG. 29 is a schematic diagram of force feedback of the fingertip by a lower right side baffle, the first electrified coil set, and the second electrified coil set when a lower right side module of the virtual finger touches the object.
Figure 30:
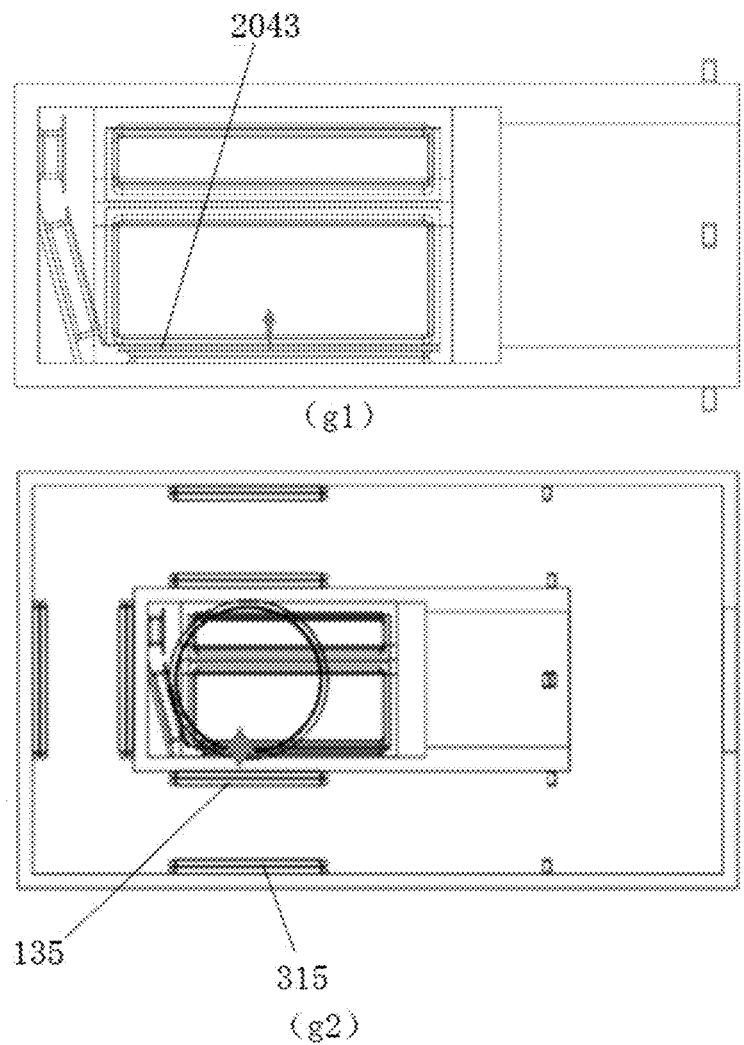
FIG. 30 is a schematic diagram of force feedback of the fingertip by a lower side baffle, the first electrified coil set, and the second electrified coil set when a lower side module of the virtual finger touches the object.

In the virtual environment, the distal finger segment of the virtual model touches a surface of the object in different directions and gestures. FIG. 23(*a*) shows contact of the front side module 1 and the object, FIG. 23(*b*) shows contact of the front lower side module 2 and the object, FIG. 23(*c*) shows contact of the upper left side module 3 and the object, FIG. 23(*d*) shows contact of the lower left side module 4 and the object, FIG. 23(*e*) shows contact of the upper right side module 5 and the object, FIG. 23(*f*) shows contact of the lower right side module 6 and the object, and FIG. 23(*g*) shows contact of the lower side module 7 and the object. Different parts of the distal finger segment touch the object surface to trigger the touch detection algorithm of the corresponding module touching the object surface, a touch signal is transmitted to an Arduino control board by the PC, the Arduino control board can control a circuit connecting an air pump (not shown) and the air bag block, and after the signal is received, the circuit is connected, the air pump inflates an air bag in a direction corresponding to the module touching the object surface, the air bag block pushes the baffle forwards, the baffle contacts the same position on the distal finger segment of an executor as the virtual contact module, and finger tactile feedback information is transmitted to the executor. The feedback device can provide tactile feedback of seven different orientations to the distal finger segment, as shown in FIGS. 24 to 30. As shown in FIG. 24(*a*1), the front side air bag block 2112 is inflated to push the front side baffle 2113 to move to the front side of the fingertip 8 and touch the front side of the fingertip 8; as shown in FIG. 25(*b*1), the front lower side air bag block 2122 is inflated to push the front lower side baffle 2123 to move to the front lower side of the fingertip 8 and touch the front lower side of the fingertip 8; as shown in FIG. 26(*c*1), the upper left side air bag block 2132 is inflated to push the upper left side baffle 2133 to move to the upper left side of the fingertip 8 and touch the upper left side of the fingertip 8; as shown in FIG. 27(*d*1), the lower left side air bag block 2142 is inflated to push the lower left side baffle 2143 to move to the lower left side of the fingertip 8 and touch the lower left side of the fingertip 8; as shown in FIG. 28(*e*1), the upper right side air bag block 2152 is inflated to push the upper right side baffle 2153 to move to the upper right side of the fingertip 8 and touch the upper right side of the fingertip 8; as shown in FIG. 29(*f*1), the lower right side air bag block 2162 is inflated to push the lower right side baffle 2163 to move to the lower right side of the fingertip 8 and touch the lower right side of the fingertip 8; as shown in FIG. 30(*g*1), the lower side air bag block 2042 is inflated to push the lower side baffle 2043 to move to the lower side of the fingertip 8 and touch the lower side of the fingertip 8.

Meanwhile, when the distal finger segment of the virtual model touches the object surface in different gestures, different parts of the distal finger segment touch the object surface to trigger the touch detection algorithm of the corresponding module contacting the object surface, the touch signal is transmitted to the Arduino control board by the PC, the Arduino control board can control a circuit connecting the first electrified coil set on the outer wall of the holder 10 and the second electrified coil set on the inner wall of the shell 30, and according to the module of the virtual distal finger segment touching the object, one or two pairs of five pairs of electrified coils including the first front electrified coil 131 and second front electrified coil 311, the first left electrified coil 132 and second front electrified coil 312, the first right electrified coil 133 and second right electrified coil 313, the first upper electrified coil 134 and second upper electrified coil 314, and the first lower electrified coil 135 and second lower electrified coil 315 are selected, currents in the same direction are introduced to generate homopolar magnetic fields, and by utilizing a principle that homopolar magnetic fields repel each other, position deviation of the holder 10 in the shell 10 relative to the shell 100 and obstruction of finger movement are generated, and then, force feedback information is transmitted to the distal finger segment.

Meanwhile, vector addition may be performed for the magnetic fields generated by the five pairs of electrified coils for the holder 10, the magnetic field generated by the electrified coil is in direct proportion to the introduced current, and the generated magnetic field can be changed by changing the current in the electrified coil, such that a direction of a synthesized magnetic field can be adjusted, and multi-orientation force feedback information can be transmitted to the distal finger segment, as shown in FIGS. 24 to 30. As shown in FIG. 24(a2), currents in the same direction are introduced into the first front electrified coil 131 and the second front electrified coil 311 to generate a repulsive force, thereby generating resistance to the front side of the fingertip; as shown in FIG. 25(b2), currents in the same direction are introduced into the first front electrified coil 131 and the second front electrified coil 311, and currents in the same direction are introduced into the first lower electrified coil 135 and the second lower electrified coil 315, so as to form repulsive forces, thereby generating resistance to the front lower side of the fingertip 8; as shown in FIG. 26(c2), currents in the same direction are introduced into the first left electrified coil 132 and the second left electrified coil 312, and currents in the same direction are introduced into the first upper electrified coil 134 and the second upper electrified coil 314, so as to generate repulsive forces, and force synthesis is performed, thereby generating resistance to the upper left side of the fingertip; as shown in FIG. 27(d2), currents in the same direction are introduced into the first left electrified coil 132 and the second left electrified coil 312, and currents in the same direction are introduced into the first lower electrified coil 135 and the second lower electrified coil 315, so as to generate repulsive forces, and force synthesis is performed, thereby generating resistance to the lower left side of the fingertip; as shown in FIG. 28(e2), currents in the same direction are introduced into the first right electrified coil 133 and the second right electrified coil 313, and currents in the same direction are introduced into the first upper electrified coil 134 and the second upper electrified coil 314, so as to generate repulsive forces, and force synthesis is performed, thereby generating resistance to the upper right side of the fingertip; as shown in FIG. 29(f2), currents in the same direction are introduced into the first right electrified coil 133 and the second right electrified coil 313, and currents in the same direction are introduced into the first lower electrified coil 135 and the second lower electrified coil 315, so as to generate repulsive forces, and force synthesis is performed, thereby generating resistance to the lower right side of the fingertip; as shown in FIG. 30(g2), currents in the same direction are introduced into the first lower electrified coil 135 and the second lower electrified coil 315, so as to generate a repulsive force, thereby generating resistance to the lower side of the fingertip. Force feedback transmitted to the finger after the magnetic fields generated by the electrified coils are synthesized is combined with tactile feedback of seven different orientations transmitted to the distal finger segment by the planar tactile feedback actuator, and a real touch sense is transmitted to the finger of the executor.

What is claimed is:

1. A multi-orientation fingertip planar tactile feedback device, comprising a planar tactile feedback actuator, wherein the planar tactile feedback actuator comprises a holder and a feedback mechanism, a holding hole and an accommodating cavity are provided in the holder, one end of the holding hole penetrates through the holder, the other end of the holding hole is communicated with the accommodating cavity, the feedback mechanism comprises a plurality of feedback parts, the plural feedback parts are arranged on cavity walls of the accommodating cavity respectively, and each feedback part comprises a base, an air bag block and a baffle which are sequentially connected, wherein the cavity walls of the accommodating cavity comprise a front cavity wall, a left cavity wall, a right cavity wall, and a lower cavity wall, the plurality of feedback parts comprise a front feedback part, a left feedback part, a right feedback part, and a lower feedback part, and the front feedback part, the left feedback part, the right feedback part, and the lower feedback part are arranged on the front cavity wall, the left cavity wall, the right cavity wall, and the lower cavity wall respectively;

wherein the front feedback part comprises a front side feedback part and a slant front lower feedback part, the front side feedback part and the front lower feedback part face a front side and a front lower side of the fingertip respectively, the left feedback part comprises an upper left feedback part and a lower left feedback part which are obliquely arranged, the baffle of the upper left feedback part and the baffle of the lower left feedback part face an upper left side and a lower left side of the fingertip respectively, the right feedback part comprises an upper right feedback part and a lower right feedback part which are obliquely arranged, and the baffle of the upper right feedback part and the baffle of the lower right feedback part face an upper right side and a lower right side of the fingertip respectively; and wherein the multi-orientation fingertip planar tactile feedback device further comprises a hollow shell, wherein the holder is provided in the shell, a first electrified coil set is provided on an outer wall of the holder, and a second electrified coil set is provided on an inner wall of the shell.

2. The multi-orientation fingertip planar tactile feedback device according to claim 1, wherein the outer wall of the holder comprises an outer front wall, an outer left wall, an outer right wall, an outer upper wall, and an outer lower wall, the first electrified coil set comprises a first front electrified coil, a first left electrified coil, a first right electrified coil, a first upper electrified coil, and a first lower electrified coil, the inner wall of the shell comprises an inner front wall, an inner left wall, an inner right wall, an inner upper wall, and an inner lower wall, the second electrified coil set comprises a second front electrified coil, a second left electrified coil, a second right electrified coil, a second upper electrified coil, and a second lower electrified coil, and the first front electrified coil, the first left electrified coil, the first right electrified coil, the first upper electrified coil, and the first lower electrified coil correspond to the second front electrified coil, the second left electrified coil, the second right electrified coil, the second upper electrified coil, and the second lower electrified coil respectively.

3. The multi-orientation fingertip planar tactile feedback device according to claim 2, wherein the first front electrified coil, the first left electrified coil, the first right electrified coil, the first upper electrified coil and the first lower electrified coil are arranged on the outer front wall, the outer left wall, the outer right wall, the outer upper wall and the outer lower wall respectively, and the second front electrified coil, the second left electrified coil, the second right electrified coil, the second upper electrified coil and the second lower electrified coil are arranged on the inner front wall, the inner left wall, the inner right wall, the inner upper wall and the inner lower wall respectively.

4. The multi-orientation fingertip planar tactile feedback device according to claim 3, wherein the shell comprises a shell body and a shell cover provided on the shell body.

5. The multi-orientation fingertip planar tactile feedback device according to claim 2, wherein an inner rear wall of the shell is provided with a through hole communicated with an interior of the shell.

6. The multi-orientation fingertip planar tactile feedback device according to claim 2, wherein each of the outer left wall, the outer right wall, the outer upper wall, and the outer lower wall of the holder is provided with a first support block, the first support block is provided with a first connection hole, each of the inner left wall, the inner right wall, the inner upper wall, and the inner lower wall of the shell is provided with a second support block, and the second support block is provided with a second connection hole.

* * * * *